US008995540B2

(12) United States Patent
To et al.

(10) Patent No.: US 8,995,540 B2
(45) Date of Patent: Mar. 31, 2015

(54) RADIO COMMUNICATION SYSTEM AND TRANSMITTING APPARATUS USED FOR THE SAME

(75) Inventors: Shimpei To, Osaka (JP); Minoru Kubota, Osaka (JP); Yasuhiro Hamaguchi, Osaka (JP); Osamu Nakamura, Osaka (JP); Kazunari Yokomakura, Osaka (JP); Seiichi Sampei, Suita (JP); Shinichi Miyamoto, Suita (JP); Shinsuke Ibi, Suita (JP)

(73) Assignee: Sharp Kabushiki Kaisha, Osaka (JP)

( * ) Notice: Subject to any disclaimer, the term of this patent is extended or adjusted under 35 U.S.C. 154(b) by 988 days.

(21) Appl. No.: 12/988,985

(22) PCT Filed: Apr. 22, 2009

(86) PCT No.: PCT/JP2009/058009
§ 371 (c)(1),
(2), (4) Date: Oct. 21, 2010

(87) PCT Pub. No.: WO2009/131155
PCT Pub. Date: Oct. 29, 2009

(65) Prior Publication Data
US 2011/0032973 A1    Feb. 10, 2011

(30) Foreign Application Priority Data

Apr. 22, 2008  (JP) ................................. 2008-111497

(51) Int. Cl.
*H04L 27/28* (2006.01)
*H04W 72/06* (2009.01)
(Continued)

(52) U.S. Cl.
CPC ............. *H04W 72/06* (2013.01); *H04J 11/00* (2013.01); *H04L 5/0039* (2013.01); *H04L 25/03171* (2013.01)
USPC ...................................................... 375/260

(58) Field of Classification Search
CPC ...... H04W 72/06; H04J 11/00; H04L 5/0039; H04L 25/03171

USPC ........ 375/133, 141, 259, 260, 262, 267, 285, 375/295
See application file for complete search history.

(56) References Cited

U.S. PATENT DOCUMENTS

2006/0160498 A1    7/2006  Sudo
2007/0280365 A1*  12/2007  Seki ............................. 375/260

FOREIGN PATENT DOCUMENTS

JP          11-17644 A      1/1999
JP       2002-141879 A      5/2002
(Continued)

OTHER PUBLICATIONS

Akihiko Okada, Shinsuke Ibi and Seiichi "Spectrum Shaping Technique Combined With SC/MMSE Turbo Equalizer for High Spectral Efficient Broadband Wireless Access Systems" Dec. 2007.*
(Continued)

*Primary Examiner* — Syed Haider
(74) *Attorney, Agent, or Firm* — Birch, Stewart, Kolasch & Birch, LLP

(57) ABSTRACT

To provide a system that can accommodate a greater number of terminals within a limited band and can obtain a higher transmission rate. While the number of frequency signals (spectrums) output in parallel by performing a spread spectrum from the DFT unit of each terminal is 12, the number of sub-carriers constituting one sub-channel is set at 10 or 11. In this case, the users (users A and G) allocated to the sub-channels at both ends of the band will not perform transmission of one frequency signal at the end (one sub-carrier) of all the frequency signals output from the DFT unit, whereas the users (users B to F) allocated to the other sub-channels will not perform transmission of the frequency signals at the ends (two sub-carriers). This transmission can be realized by deleting (clipping) the associated number of signals from both ends or from one end of the frequency signals output from the DFT unit of each terminal and allocating the frequency signals after clipping, to individual sub-channels.

5 Claims, 12 Drawing Sheets

(51) Int. Cl.
*H04J 11/00* (2006.01)
*H04L 5/00* (2006.01)
*H04L 25/03* (2006.01)

(56) References Cited

FOREIGN PATENT DOCUMENTS

| | | | |
|---|---|---|---|
| JP | 2004-187257 | A | 7/2004 |
| JP | 2008-124815 | A | 5/2008 |
| JP | 2008-219144 | A | 9/2008 |

OTHER PUBLICATIONS

3GPP TSG RAN WG1 #42 on LTE R1-050702 "DFT-Spread OFDM with Pulse Shaping Filter in Frequency Domain in Evolved UTRA Uplink" London, UK Aug. 29-Sep. 2, 2005 pp. 1-8.

Akihiko Okada, et al., "A study on Spectrum Division Multiplexing Technique Exploiting Frequency Clipped Spectrum Shaping for Turbo Equalization", Proceedings of the 2007 IEICE General Conference, IEICE, Mar. 7, 2007, p. 528, B-5-114 (with a partial English translation).

Mashima et al., "A Study on Broadband Single Carrier Transmission Technique using Dynamic Spectrum Control," IEICE Technical Report, The Institute of Electronics, Information and Communication Engineers, Jan. 19, 2007, pp. 97-102 with partial translation.

Okada et al., "A Proposal on Spectrum Shaping Exploiting Frequency Clipping for Turbo Equalization," IEICE Technical Report, The Institute of Electronics, Information and Communication Engineers Feb. 28, 2007, pp. 95-98 with partial translation.

* cited by examiner

RADIO COMMUNICATION SYSTEM AND TRANSMITTING APPARATUS USED FOR THE SAME

TECHNICAL FIELD

The present invention relates to a radio communication system that can accommodate a greater number of terminals within a limited band and can obtain a higher transmission rate, by setting up a lower number of sub-carriers that constitute one sub-channel compared to the number of signals output in parallel from the DFT unit of each terminal, as well as relating to a transmitting apparatus for use in the system.

BACKGROUND ART

With recent increase in volume of data communication, the need for a mobile communication system that has a higher frequency usage efficiency has been increased and various studies on one cell reuse cellular system that uses the same frequency band in all the cells have been proceeded. In E-UTRA (Evolved Universal Terrestrial Radio Access) system which is one of one cell reuse cellular systems and has been advanced to be standardized by mainly 3GPP (3rd Generation Partnership Project), the OFDMA (Orthogonal Frequency Division Multiple Access) scheme and the SC-FDMA (Single Carrier-Frequency Division Multiple Access) scheme have been discussed as the most favorable candidates for the downlink transmission scheme and uplink transmission scheme, respectively.

Of these, the OFDMA scheme is a scheme in which the user makes access in resource block units that are divided in time and frequency, using OFDM signals that are excellent in robustness against multi-path fading. Since this scheme has high PAPR (Peak-to-Average Power Ratio) performance, it is not suitable as the uplink transmission scheme that is severely limited as to transmission power. In contrast to this, since the SC-FDMA scheme can keep the PAPR performance low compared to OFDM and other multi-carrier schemes so as to obtain a wide coverage, this scheme is suitable for uplink transmission (non-patent document 1).

FIG. 10 shows a terminal apparatus configuration when this SC-FDMA scheme is used for uplink transmission. As shown in FIG. 10, in the terminal apparatus using the SC-FDMA scheme, error correction coding of transmitting data is performed first in an encoder 1000, then the data is modulated at a modulator 1001. Next, the modulated transmitting signal is serial-to-parallel converted by a S/P (Serial to Parallel) converter 1002, the converted signals are then transformed into frequency-domain signals by a DFT (Discrete Fourier Transform) unit 1003. The thus transmitting signals transformed into frequency-domain signals are allocated to sub-carriers for transmission use at sub-carrier mapping unit 1004. Allocation at this point is performed based on the mapping information that was transmitted from a base station apparatus, received by a receiving antenna unit 1011, passed through a radio unit 1012 and an A/D (Analog to Digital) converter 1013 and demodulated at a receiver 1014 while zero is inserted to the sub-carriers unused for transmission. At DFT unit 1003, time-frequency transformation of the same size as the number of sub-carriers that constitute one sub-channel defined in the system is performed. All the signals after time-frequency transformation are allocated to given sub-carriers (sub-channels) and transmitted. For example, when the number of sub-carriers that constitute one sub-channel is 12, the size of time-frequency transformation carried out at DFT unit 1003 is also 12, indicating that all the outputs from DFT unit 1003 are input to sub-carrier mapping unit 1004.

As the allocation method at this point, in E-UTRA system, an allocation method called localized allocation that uses contiguous sub-carriers or an allocation method called distributed allocation that uses sub-carriers located a constant distance apart have been discussed. FIG. 11 shows these two allocation examples. FIGS. 11(a) and (b) show the localized allocation and the distributed allocation, respectively. The illustration herein shows a case where the number of sub-carriers for one sub-channel is 12 and six users are frequency-division multiplexed. Of these allocation methods, the localized allocation is suitable for obtaining multi-user diversity gain, whereas the distributed allocation is suitable for obtaining frequency diversity gain.

The transmitting signals that have been allocated onto the sub-carriers (sub-channels) for transmission use at sub-carrier mapping unit 1004 in the terminal apparatus in FIG. 10 are then input to an IDFT (Inverse Discrete Fourier Transform) unit 1005, and transformed from frequency-domain signals to time-domain signals. Then, the signals pass through a P/S (Parallel to Serial) converter 1006 to a CP (Cyclic Prefix) inserter 1007, where CP (the signal generated by duplicating the rear part of the symbol after IDFT) is inserted. Then, the signal is converted into the analog signal at a D/A (Digital to Analog) converter 1008. The resultant is up-converted to a radio frequency band signal at a radio unit 1009 so as to be transmitted from a transmitting antenna unit 1010. The thus generated transmitting signal has the advantage of its PAPR being low compared to a multi-carrier signal.

FIG. 12 shows a base station apparatus configuration for receiving signals transmitted from the terminal apparatus of FIG. 10. As shown in FIG. 12, in the base station apparatus receiving signals of SC-FDMA scheme, the signal received at an antenna unit 2000 is converted to an A/D convertible frequency at radio unit 2001 first. Then, the signal is converted into a digital signal by an A/D converter 2002. Subsequently, a synchronizer 2003 establishes symbol synchronization. Then, after CP is removed from every symbol at a CP remover 2004, the signal passes through a S/P converter 2005, so that the signals in time domain are converted into signals in frequency domain by a DFT unit 2006. The pilot signal for channel estimation (a known signal transmitted together with the data signal from the terminal apparatus), having been converted in the form of a frequency-domain signal is sent to channel estimator 2007, where channel estimation is performed.

The signal the base station apparatus receives is a set of frequency division multiplexed signals transmitted from a plurality of terminals as shown in FIG. 11. A sub-carrier demapping unit 2008, based on the mapping information (the information that specifies the relationships between terminal apparatuses and sub-carriers used by the terminal apparatuses) determined beforehand by a scheduling unit 2012, picks up sub-carriers (sub-carriers that constitute one sub-channel) to be used for every terminal apparatus. Then, in an equalizer 2009, an equalization process for the received sub-carriers collected for each terminal apparatus is carried out based on the estimated channel. Then, after transformation at an IDFT unit 2010 from frequency-domain signals to time-domain signals, the transmitted data for every terminal apparatus is regenerated at a demodulation and error correction decoder 2011.

Also, a pilot signal for reception-level measurement is sent from DFT unit 2006 to scheduling unit 2012. Based on the measurement result on the reception level using this signal, scheduling unit 2012 performs scheduling, taking into account the transmission condition of each terminal. The mapping information determined by scheduling unit 2012 is subjected to modulation and the like at a transmitter 2013, passed through a D/A unit 2014, radio unit 2015 and the like, and then transmitted from an antenna unit 2016 to each terminal. This mapping information is used for transmission of the next frame and afterward on the terminal side.

PRIOR ART DOCUMENT

Non-Patent Document

Non-patent document 1: 3GPP, TSG RAN WG1 on LTE, R1-050702, "DFT-spread OFDM with Pulse Shaping Filter in Frequency Domain in Evolved UTRA Uplink"

SUMMARY OF INVENTION

Problems to be Solved by the Invention

As described above, the aforementioned SC-FDMA scheme is the most favorable candidate for the uplink transmission scheme in E-UTRA system. The SC-FDMA scheme as well as the OFDMA scheme is a scheme in which the user makes access in resource block units completely divided in time and frequency, and use of the SC-FDMA scheme makes it possible to keep the PAPR performance low and realize a one cell reuse system with a wide coverage obtained. However, under the current environment in which the tightness of frequency resources has been accelerated with increase in number of users, there is a limit to the number of users accommodated even though in use of the SC-FDMA scheme. Therefore, it is necessary to construct a system that can realize a further efficient usage of frequency with increase in number of users.

In view of the above circumstances, the present invention is to provide a radio communication system that can accommodate a greater number of terminals within a limited band and can obtain a higher transmission rate as a whole system, as well as providing a transmitting apparatus for use in the system.

Means for Solving the Problems

The present invention is a radio communication system comprising: a transmitting apparatus that transmits spread spectrum transmitting signals by allocating the signals to any one of a plurality of frequency channels defined in a constant frequency band formed of a plurality of sub-carriers and to any one of a plurality of time channels defined with a constant time length; and a receiving apparatus for receiving the transmitting signals, wherein the transmitting apparatus deletes part of the spread spectrum signals allocated to the frequency channel so as to reduce the number of sub-carriers for each of the frequency channel, transform the signals into time-domain signals and transmits the signals, and the receiving apparatus transforms received signals into frequency-domain signals and separates the signals into signals for each frequency channel and performs non-linear iterative equalization to reproduce the transmitted signals.

Herein, the transmitting apparatus is characterized by deleting a signal for one or more sub-carriers at one end or at both ends, among the spread spectrum signals to be allocated to the frequency channel and allocating the resultant signals to the frequency channel.

Further, the transmitting apparatus is characterized by changing the number of signals to be deleted, in accordance with the frequency channel to which spread spectrum signals are allocated.

Also, the transmitting apparatus is characterized by changing the number of signals to be deleted, in accordance with the time channel to which spread spectrum signals are allocated.

The transmitting apparatus is characterized in that the number of the actually transmitting spread spectrum signals that are allocated to the frequency channel is set equal for a plurality of transmitting apparatuses.

Further, the receiving apparatus is characterized by inserting zeros into a position of one or more sub-carriers that were deleted at one end or both ends, in the transmitting apparatus, and performing a non-linear iterative equalization process.

The present invention is a transmitting apparatus that transmits spread spectrum transmitting signals by allocating the signals to any one of a plurality of frequency channels defined in a constant frequency band formed of a plurality of sub-carriers and to any one of a plurality of time channels defined with a constant time length, comprising: modulating means for modulating transmitting signals; frequency transforming means that transforms the modulated signals by a spread spectrum into frequency-domain signals; clipping means that deletes part of the spread spectrum signals allocated to the frequency channel to reduce the number of sub-carriers per each of the frequency channels; mapping means that allocates the frequency signals after clipping to a frequency channel; and, time transforming means that transforms frequency-domain signals to time-domain signals to allocate the result to a time channel.

Herein, the clipping means is characterized by changing the number of signals to be deleted, in accordance with the frequency channel to which spread spectrum signals are allocated.

Further, the clipping means is characterized in that by changing the number of signals to be deleted, in accordance with the time channel to which spread spectrum signals are allocated.

Moreover, the mapping means is characterized by setting the number of the actually transmitting spread spectrum signals that are allocated to the frequency channel, equal for a plurality of transmitting apparatuses.

Advantages of the Invention

According to the present invention, since part of the spread spectrum signals allocated to the frequency channels is deleted so as to reduce the number of sub-carriers for each of the frequency channels, it is possible to provide a greater number of frequency channels, improve frequency efficiency and obtain a high transmission rate in terms of the whole system. Further, since received signals are transformed into frequency-domain signals, which are separated into signals for every frequency channel and subjected to non-linear iterative equalization to reproduce the transmitted signal, it is possible to achieve transmission without degrading performance so much even though the number of sub-carriers available for transmission is lower than the number of signals to be transmitted (the number of signals output from the DFT unit).

Further, by changing the number of signals to be deleted in accordance with the frequency channel to which spread spectrum signals are allocated, it is possible to allocate frequency channels in conformity with the channel conditions of individual users, hence it is possible to reproduce transmitted data without serious degradation of performance.

Moreover, by changing the number of signals to be deleted in accordance with the time channel to which spread spectrum signals are allocated, it is possible to provide different frequency channels every time channel, allocate time channels in conformity with the channel conditions of individual users, hence it is possible to reproduce transmitted data without serious degradation of performance.

MODES FOR CARRYING OUT THE INVENTION

Now, embodiments of the present invention will be described with reference to the accompanying drawings.

The present invention relates to a SC-FDMA system that can accommodate a greater number of terminals within a limited band and can obtain a higher transmission rate, by setting up a lower number of sub-carriers constitute one sub-channel compared to the number of signals output in parallel from the DFT unit of each terminal, and can greatly improve frequency usage efficiency compared to a E-UTRA system.

The First Embodiment

To begin with, in the present embodiment, a method of allocating sub-carriers in a SC-FDMA system where the number of sub-carriers that constitute one sub-channel is set to be lower than the number of signals output in parallel from the DFT unit of each terminal.

Figure 1:
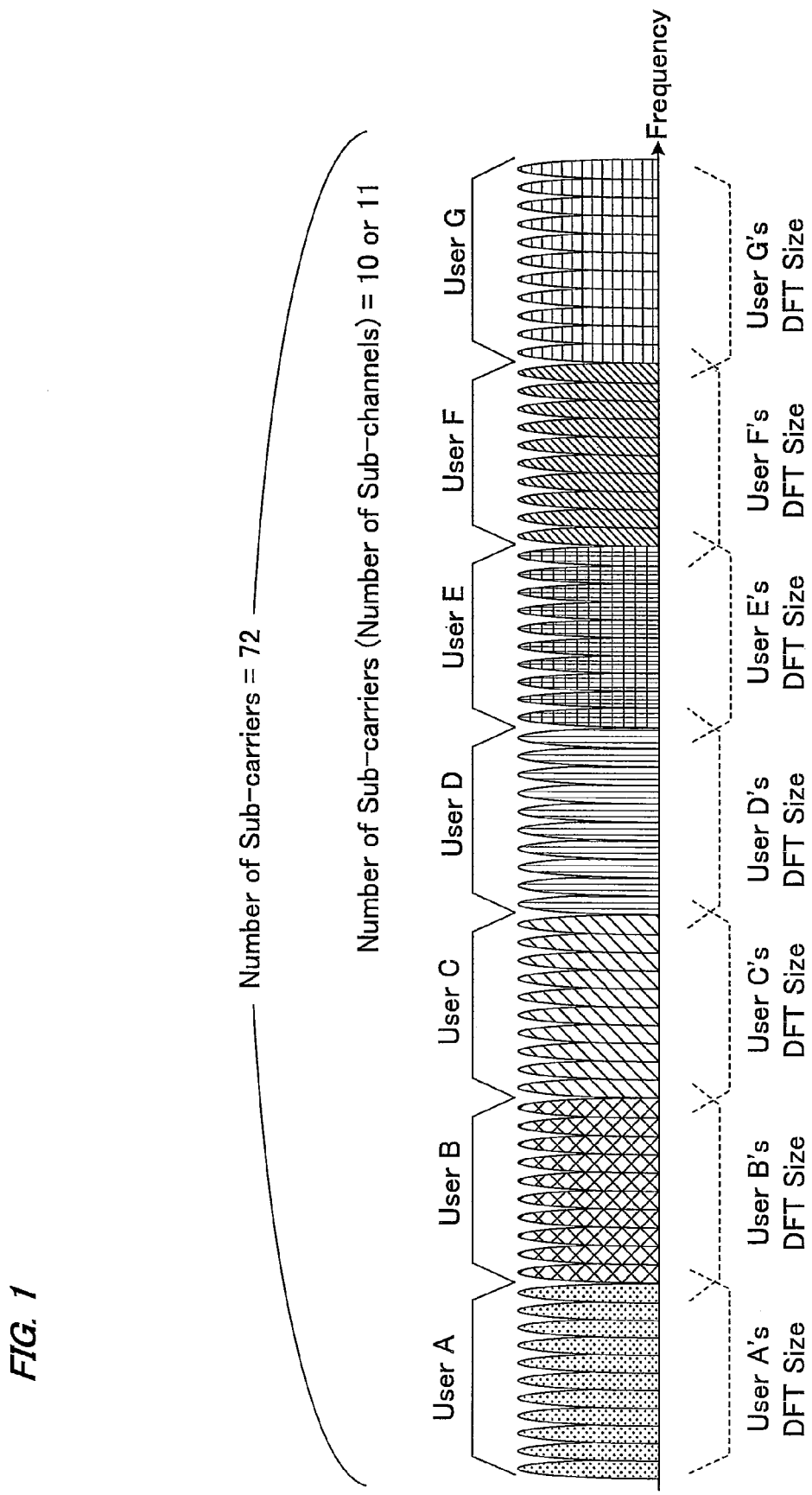
FIG. 1 is a diagram showing an example of sub-carriers being applied to a localized allocation in a SC-FDMA based radio communication system according to the present invention.
Figure 11:
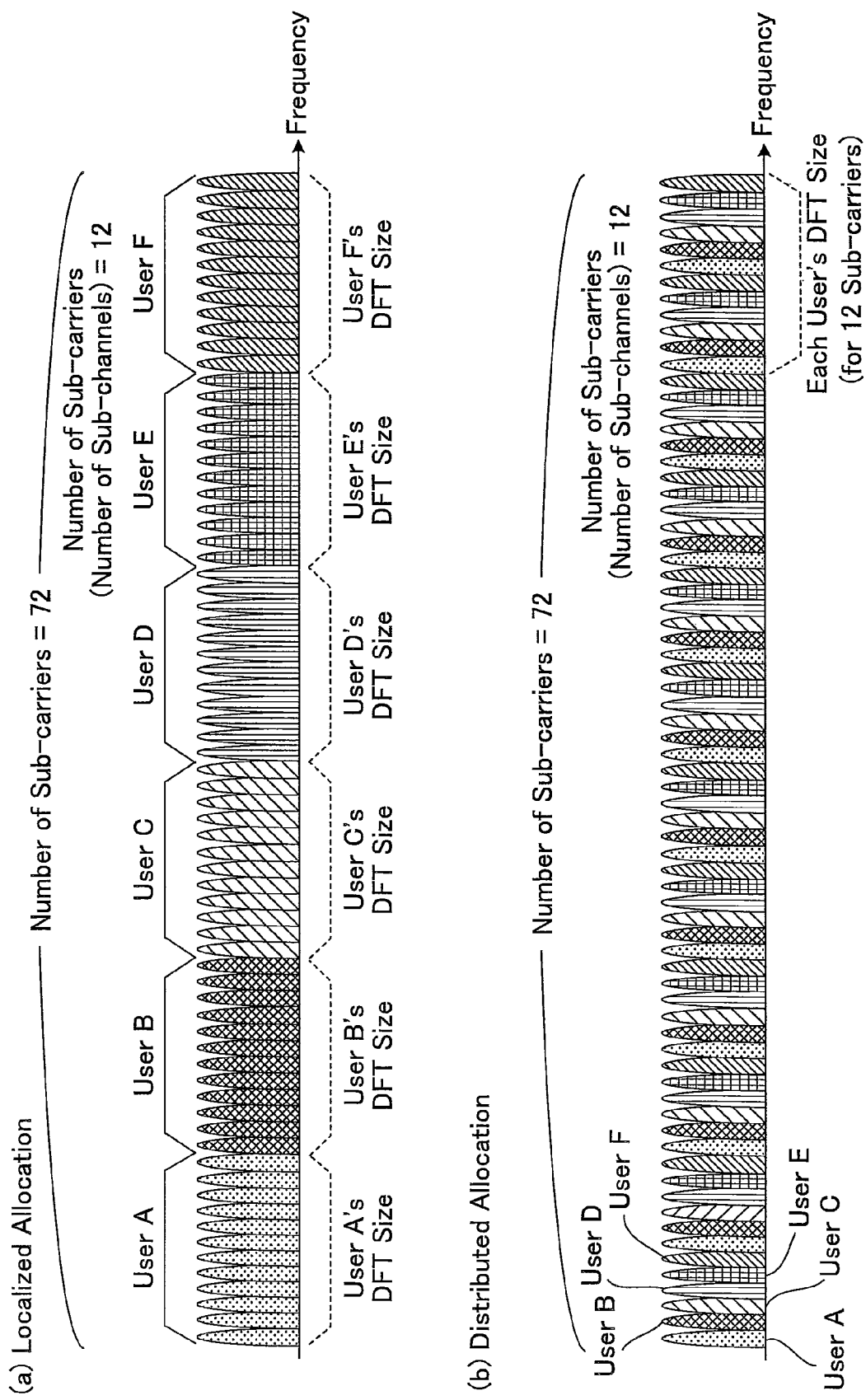
FIG. 11 is a diagram showing a localized allocation and a distributed allocation of sub-carriers, respectively, in a conventional E-UTRA system.
Figure 12:
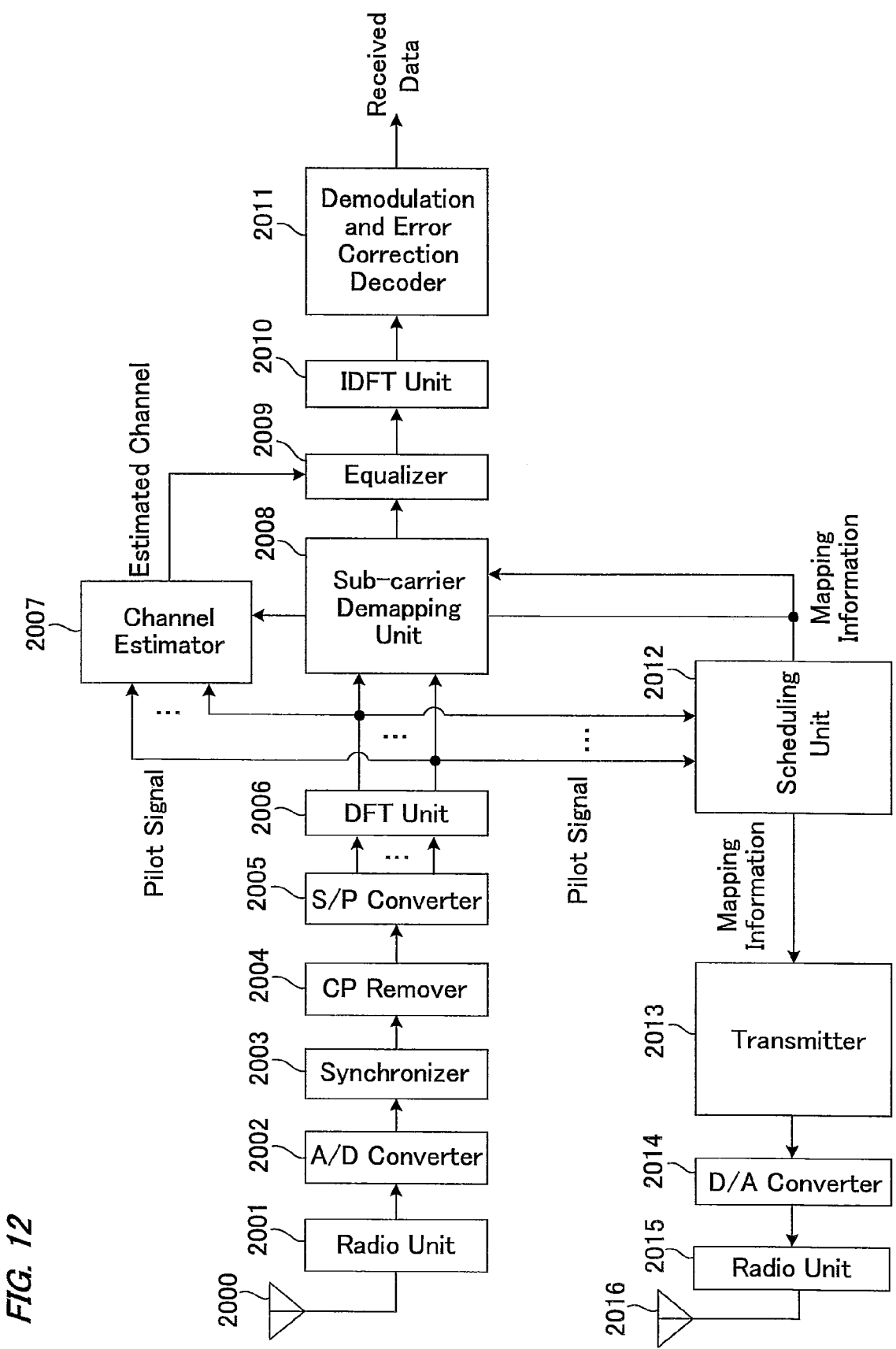
FIG. 12 is a block diagram showing a base station apparatus for receiving signals transmitted from the terminal apparatus of FIG. 10.

FIG. 1 shows an example where the present invention is applied to a localized allocation. This FIG. 1 shows an example in which the number of frequency signals (spectrums) that are performed a spread spectrum and output in parallel from the DFT unit of each terminal is 12 (that is, the DFT size is 12), whereas the number of sub-carriers that constitute one sub-channel (one frequency channel) is set at 10 or 11. In this case, the users (users A and G) allocated to the sub-channels (frequency channels) at both ends of the band will not perform transmission of the frequency signal at one end (one sub-carrier) of all the frequency signals output from the DFT unit, whereas the users (users B to F) allocated to the other sub-channels will not perform transmission of the frequency signals at both ends (two sub-carriers) of all the frequency signals output from the DFT unit. This transmission can be realized by removing (clipping) the appropriate number of signals from both ends or from one end of the frequency signals output from the DFT unit of each terminal and allocating the frequency signals after clipping to individual sub-channels. From this method, it is understood that a greater number of sub-channels can be created (a greater number of users can be accommodated) with the same number of sub-carriers (72 sub-carriers in this case) as that of the conventional SC-FDMA system (FIG. 11) (7 sub-channels in FIG. 1 in contrast to 6 sub-channels in FIG. 11), hence it is possible to obtain a higher transmission rate in terms of the whole system.

Usually, in the clipping process in single carrier transmission, the gain of the frequency response of the channel in the sub-carrier that is missing due to clipping is regarded as zero, so that it is not only impossible to reproduce by a linear equalizing process but the impulse response of the channel becomes long if observation is made on time signals. As a result, inter-symbol interference that causes a time signal to interfere with a next signal, gives a strong influence. This means that there is no other method than the technique of lowering the coding rate of error correcting codes in order to detect signals having spread over the time axis. Accordingly, the transmission rate has to be lowered in proportion to the amount of clipping.

However, in the present invention, the transmitted signal spread on the time axis is processed such that the missing sub-carriers are regenerated by the coding gain of error correction coding while the clipped sub-carriers are regenerated by composition of energy by reducing inter-symbol interference using non-linear iterative equalization including canceling. That is, since the present invention enables accommodation of a greater number of users with maintaining the transmission rate of each user (each sub-channel), it is possible to improve frequency usage efficiency compared to the conventional SC-FDMA system.

Figure 2:
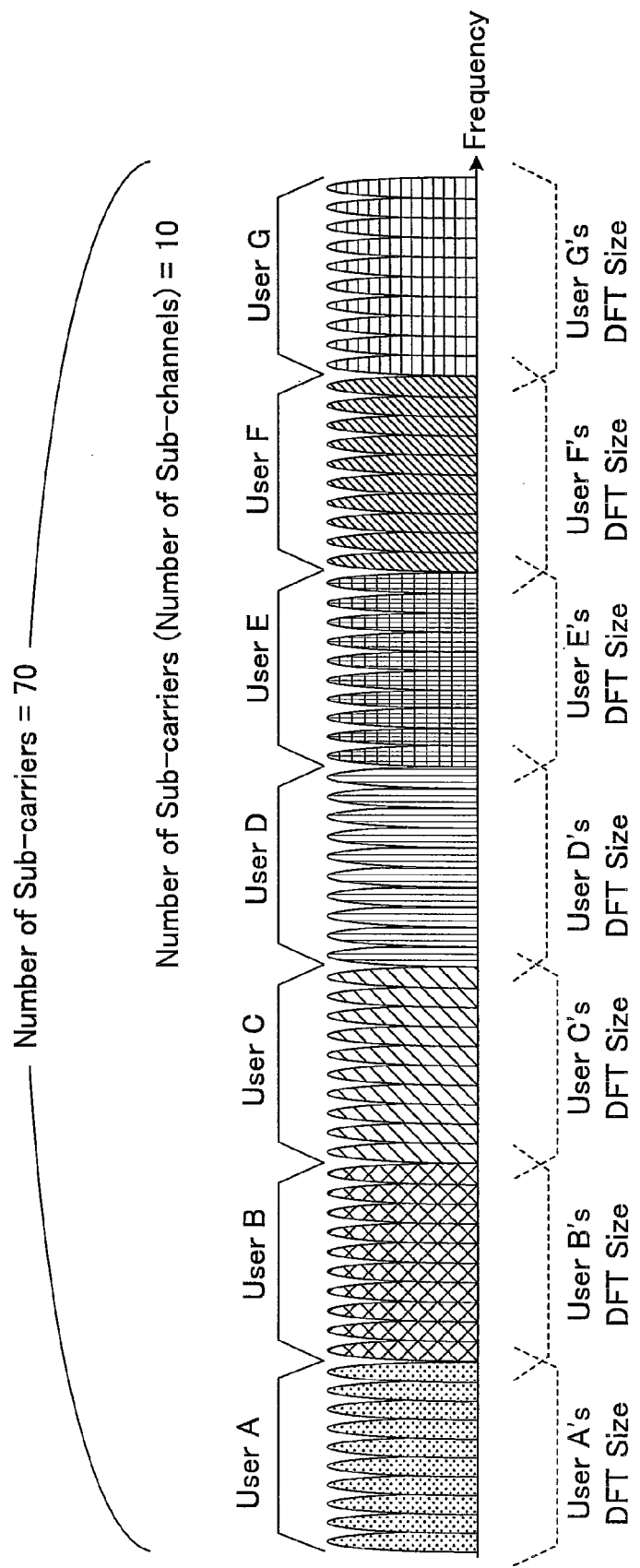
FIG. 2 is a diagram showing a localized allocation in a SC-FDMA based radio communication system according to the present invention, in which the same number of frequency signals are clipped off from all the users.

The allocation of sub-channels shown in FIG. 1 gives an example in which the number of frequency signals to be clipped is different between the users allocated to the sub-channels at both ends of the band and the users allocated to the sub-channels other than those. Other than this, the number of frequency signals to be clipped may be set equal for all the users. FIG. 2 shows this example. In the configuration shown in FIG. 2, also for the users allocated to the sub-channels at both ends of the band, the frequency signals located at both ends of the output from the DFT unit are clipped. As a result, it is understood that the transmission rate of each user can be maintained with a lower number of sub-carriers compared to the case of FIG. 1 (70 sub-carriers in total in FIG. 2, whereas 72 sub-carriers in total in FIG. 1) while it is possible to accommodate a greater number of users.

Figure 3:
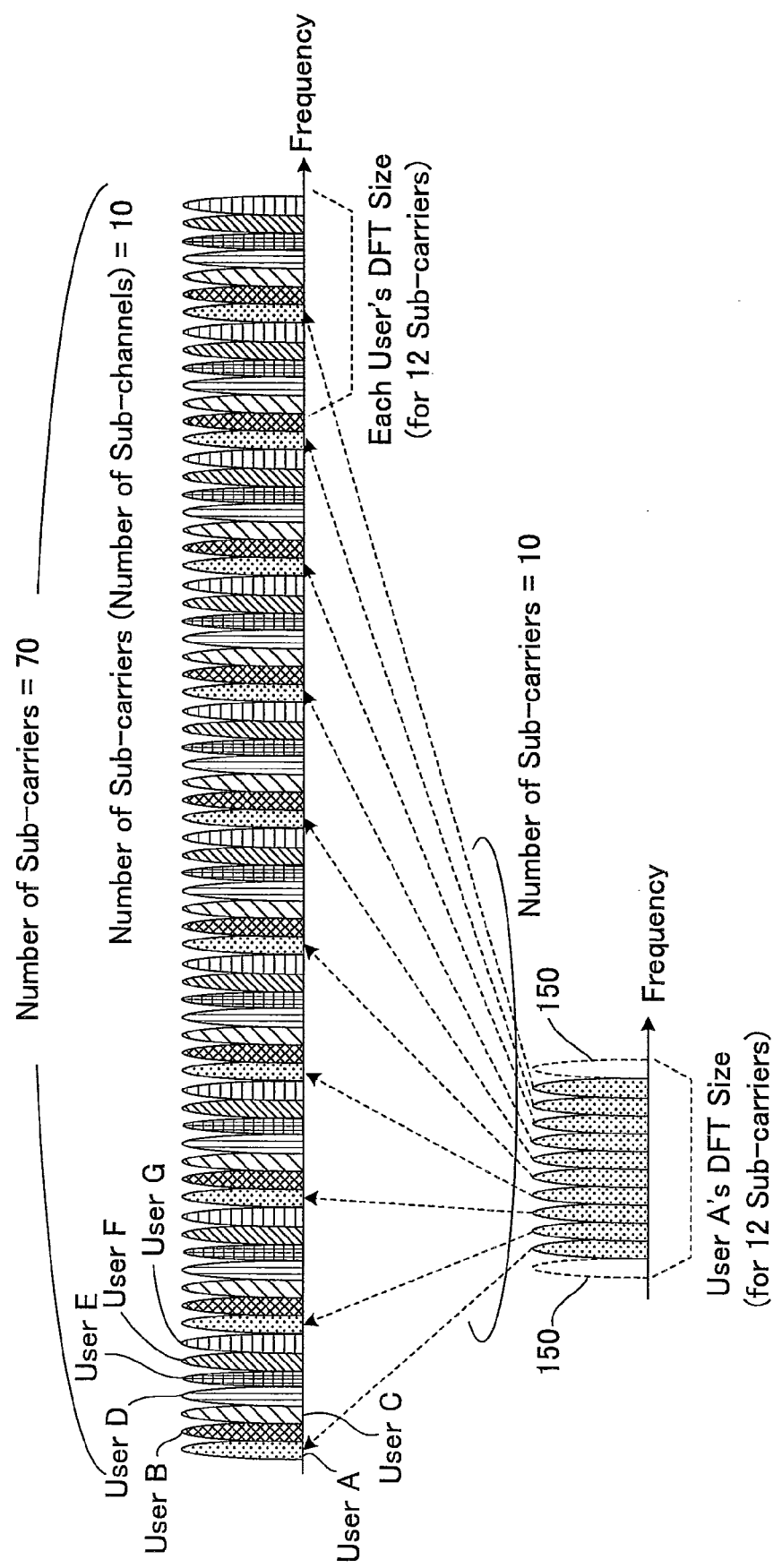
FIG. 3 is a diagram showing an example of sub-carriers being applied to a distributed allocation in a SC-FDMA based radio communication system according to the present invention.

FIG. 3 shows an example in which the present invention is applied to a distributed allocation. FIG. 3 shows a case in which the output from the DFT unit of each user is shaped by clipping off the frequency signals at both ends (2 sub-carriers) similarly to the case shown in FIG. 2 and the resultant is arranged in a distributed allocation (the sub-carriers clipped are designated by 150 in FIG. 3). That is, while the number of frequency signals (spectrums) output in parallel from the DFT unit of each user is 12, the number of sub-carriers to be actually transmitted is 10 sub-carriers per user. In this way, when the signals with their frequency signals partly clipped are arranged in a distributed allocation and transmitted, it is also possible by a lower number of sub-carriers than that of the conventional SC-FDMA system to accommodate a greater number of users with keeping up the transmission rate of each user.

Though these FIGS. 1 to 3 show examples in which, with respect to each user, one spectrum is clipped from at least one end (two spectrums are clipped when both ends are clipped), multiple spectrums may be clipped from the end when a system with a further improved efficiency of frequency usage is constructed. In this case, it is preferable that the number and positions (at both ends or one end) of spectrums to be clipped are previously determined in the system. In this way, previous specification of the number of spectrums and positions to be clipped makes addition of extra control information unnecessary.

Further, in usual radio communication systems, a band called a guard band on which no transmission of signals (sub-carriers) is performed, needs to be provided in order to deal with the problem of analog filtering performance. Since it is totally impossible to transmit signals on this guard band, it is not preferable to provide the guard band in view of frequency usage efficiency. However, it is possible to prevent lowering of frequency usage efficiency by applying the clipping as in the present invention. This can be realized by setting the total number of spectrums to be clipped after DFT equal to the number of sub-carriers to be the guard band. For example, in a situation where one user uses all the sub-carriers other than the guard band, if a DFT unit having a bandwidth equal to the full bandwidth including the guard band, is given, the signals to be transmitted are those obtained by clipping the number of sub-carriers to be the guard band from the end of the output frequency signals from the DFT unit. Clipping in this way makes it possible to transmit as many signals as that when no guard band is provided, despite that the guard band is provided, hence it is possible to prevent lowering of frequency usage efficiency resulting from the guard band.

Figure 4:
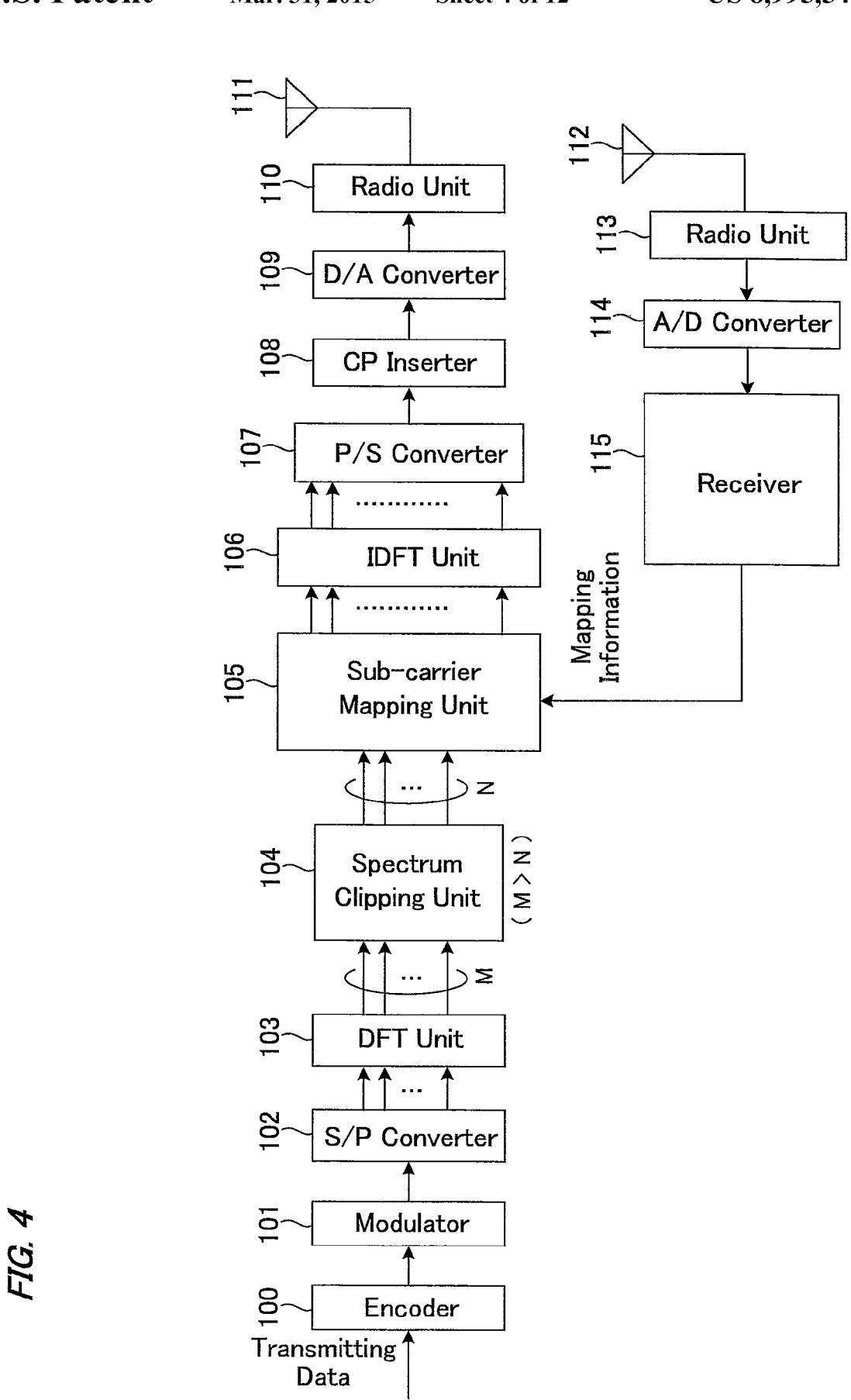
FIG. 4 is a block diagram showing a configuration of a terminal apparatus that performs uplink transmission in the first embodiment of a radio communication system according to the present invention.

Now, FIG. 4 shows a configuration of a terminal apparatus that implements the uplink transmission as described above. As shown in FIG. 4, in the terminal apparatus in the present embodiment, error correction coding of transmitting data is performed first in an encoder 100, then the data is modulated at a modulator 101. Next, the modulated transmitting signal is serial-to-parallel converted by a S/P converter 102, the converted signals are then transformed into frequency-domain signals by a DFT (Discrete Fourier Transform) unit 103. Then, clipping is performed for the thus time-frequency transformed frequency signals (spectrums) at a spectrum clipping unit 104. This clipping is an operation of removing some signals (spectrums) from both ends or one end of the output from DFT unit 103. The numbers of input/output signals of spectrum clipping unit 104 are given as M and N, M>N holds. As in the example shown in FIG. 1, there are cases in which the number of signals to be clipped changes depending on the sub-channels to be allocated. Spectrum clipping unit 104 is adapted to perform clipping, taking this matter into account.

The signals after some signals having been clipped at spectrum clipping unit 104 are input to a sub-carrier mapping unit 105, and allocated to the sub-carriers for transmission use. The allocation at this point is performed based on the mapping information that was transmitted from the base station apparatus, received by a receiving antenna unit 112, passed through a radio unit 113 and an A/D converter 114 and demodulated at a receiver 115 while zero is inserted to the sub-carriers (other sub-channels) unused for transmission. Here, the number of sub-carriers that forms one sub-channel is N, i.e., equal to the number of output signals from spectrum clipping unit 104. At this point, the power of the signals that have been clipped already is added to the signals (the mapped signals) used for actual transmission so as to keep up the total transmission power.

The transmitting signals that have been allocated onto the sub-carriers (sub-channels) for transmission use at sub-carrier mapping unit 105 in the above way, are then input to an IDFT (Inverse Discrete Fourier Transform) unit 106, and transformed from frequency-domain signals to time-domain signals. At this point, the signals of individual users, multiplexed in frequency domain will use the same time channel. Then, the signals are passed through a P/S converter 107 to a CP (Cyclic Prefix) inserter 108, where CP (the signal generated by duplicating the rear part of the symbol after IDFT) is inserted. Then, the signal is converted into the analog signal at a D/A converter 109. The resultant is up-converted to a radio frequency band signal at a radio unit 110 so as to be transmitted from a transmitting antenna unit 111.

The configuration of the terminal apparatus as above makes it possible to transmit signals without interfering (using any overlapped sub-carrier) with the other users within the same cell in the SC-FDMA system in which the number of sub-carriers that constitute one sub-channel is set to be lower than the number of signals output in parallel from the DFT unit. Further, it is possible to perform transmission without degrading performance too much, despite that the number of sub-carriers available for transmission is smaller than the number of signals should be transmitted (the number of signals output from the DFT unit).

The Second Embodiment

This embodiment shows a configuration of a receiving apparatus (base station apparatus) that, when receiving a signal from which part of spectrums was clipped off, can reproduce the transmitted data without degrading performance too much by using non-liner iterative equalization having an excellent interference reducing function (e.g., frequency domain SC/MMSE (Soft Canceller followed by Minimum Mean Square Error) turbo equalization).

Figure 5:
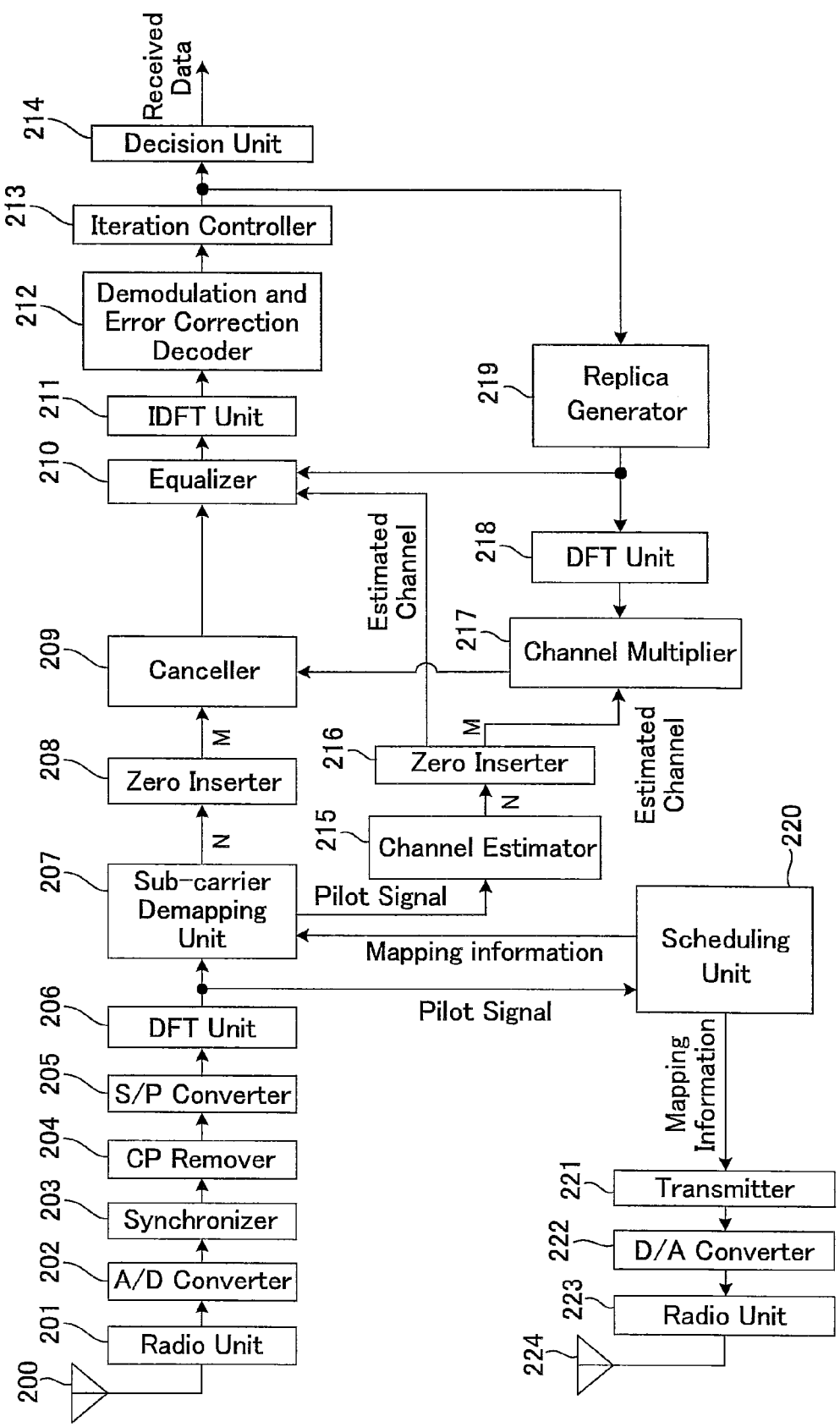
FIG. 5 is a block diagram showing a base station apparatus in the second embodiment of the radio communication system according to the present invention.

FIG. 5 shows a base station apparatus in the present embodiment. As shown in FIG. 5, the base station apparatus in the present embodiment includes a receiving antenna unit 200, a radio unit 201, an A/D converter 202, a synchronizer 203, a CP remover 204, a S/P converter 205, a DFT unit 206, a sub-carrier demapping unit 207, a zero inserter 208, a canceller 209, an equalizer 210, an IDFT unit 211, a demodulation and error correction decoder 212, an iteration controller 213, a decision unit 214, a channel estimator 215, a zero inserter 216, a channel multiplier 217, a DFT unit 218, a replica generator 219, a scheduling unit 220, a transmitter 221, a D/A converter 222, a radio unit 223 and a transmitting antenna unit 224.

As shown in FIG. 5, in the base station apparatus in the present embodiment, signals received by receiving antenna 200 are each transformed into an A/D convertible frequency at radio unit 201, then converted into digital signals at A/D converter 202. Subsequently, symbol synchronization is established at synchronizer 203. After removal of CP from each symbol at CP remover 204, the signals, passing through S/P converter 205, are each converted from time-domain signals to frequency-domain signals at DFT unit 206. The signals that were transformed into frequency-domain signals are separated into individual signals of different sub-channels (users) at sub-carrier demapping unit 207. From this point forward, the received signals of individual users will be processed separately.

Since the amount of signals for one sub-channel (one user) separated at sub-carrier demapping unit 207 is lower than that of the output from the DFT on the transmitter side, zero inserter 208 inserts zeros into the same frequency components as those clipped on the transmitter side. This operation is to add zero(s) at both ends or one end of the output signal from sub-carrier demapping unit 270. As a result, as many frequency signals as those output from the DFT used on the transmitter side are output from zero inserter 208. This zero insertion is performed also at zero inserter 216, for the estimated channel calculated at channel estimator 215 using the pilot signal for channel estimation. In this way, in the receiving apparatus in the present embodiment, the spectrums that were clipped off on the transmitter side are equalized by handing them as if they were missing due to fading of channel. Here in this case, zero inserter 208 is provided downstream of sub-carrier demapping unit 207 in order to make description clear. However, this is not essential. Because zero is inserted into the pilot signal for channel estimation at zero inserter 216, the clipped spectrum is handled as 0 and will not be synthesized in equalizer 210 even if no zero inserter 208 is provided.

Next, the output signal from zero inserter 208 are input to canceller 209, where the soft replica of the received signal, which is calculated by multiplication (calculated at propagation path multiplier 217) of the channel estimation value having zeros inserted at the positions of the clipped spectrums with the soft replica of the transmitted signal that is generated at replica generator 219 based on the reliability of the own signal, is subtracted from the input signal. In this way, in the frequency-domain SC/MMSE turbo equalization used in the present embodiment, the soft replica of the received signal is once cancelled out of the received signal so that the residual signal component is calculated. Since inverse matrix calculation is performed in the aftermentioned equalizer 210, if cancellation and equalization are iterated with the desired signals alone left, it is necessary to perform, at least, as many number of times of inverse matrix calculation as the number of the desired signals included in the block. In contrast, when the totally cancelled residual component is input, the residual signals can be handled in common within the block, hence it is possible to calculate all the weights by performing inverse matrix calculation once within the block. For this purpose, the soft replica of the transmitted signal is separately input to equalizer 210 to perform reconstruction, whereby the amount of calculation associated with inverse matrix calculation is reduced. Here, however, since no signal replica has been generated at the first process, the received signal is transferred to equalizer 210 as it is without performing any canceling process.

In equalizer 210, based on the residual component as the output from canceller 209, the estimated channel of the desired signals and the soft replica of the desired signals, signal equalization is performed. Specifically, in equalizer 210, the optimal weight is calculated from the residual component, estimated channel, soft replica of the signal, and the time-axis signal multiplied by the optimal weight after the final equalization is output. Here, since no soft replica is input at the first process, this process is equivalent to the conventional MMSE equalization that performs no canceling.

The equalized signal is transformed into the time-domain signal at IDFT unit 211, then the signal is demodulated and error corrected by demodulation and error correction decoder 212. As a result, the extrinsic log likelihood ratio (LLR: Log Likelihood Ratio) of code bits enhanced in reliability is output from demodulation and error correction decoder 212. Here, the external LLR represents the reliability improved by an error correcting process only. That is, the LLR that is finally output by performing the error correcting process on the LLR input from equalizer 210 (which is called priori LLR) is the posteriori LLR that involves consideration on the reliability obtained from equalizer 210. In turbo equalization, this posteriori LLR is fed back to equalizer 210 again so as to subtract the priori LLR input. The extrinsic LLR output from demodulation and error correction decoder 212 is controlled as to whether the process is iterated by iteration controller 212, and is input to replica generator 219 when this process is repeated, in order to generate the soft replica of the signal. As described above, in replica generator 219, the soft replica is generated in proportion to the reliability of the LLR of the coded bits. The thus generated soft replica is input to, DFT unit 218 in order to temporarily cancel the received signal component to which the desired frequency signal contributes in canceller 209, and equalizer 210 in order to reconstruct the desired signal upon equalization.

In this way, the process after canceller 209 is iterated, so that it is possible to obtain coded bits having been gradually improved in reliability. After iteration of the predetermined number of times controlled by iteration controller 213, the LLR of information bit is hard decided at decision unit 214 to obtain decoded data.

The present embodiment was described taking an example of a base station configuration in which the received signal of each user (sub-channel) is sequentially selected and the process for the selected signal is serially implemented. However, zero inserter 208, canceller 209, equalizer 210, IDFT unit 211, demodulation and error correction decoder 212, replica generator 219, DFT unit 218, channel multiplier 217 and the like may be provided as many as the sub-channels, whereby it is possible to perform processing for all the users simultaneously. Further, the predetermined number of iteration may be fixed, or it is also possible to perform adaptive control such that the process is iterated until the result of demodulation and error correction decoder 212 becomes free from error. Moreover, in a system where there are sub-channels having different numbers of frequency signals to be clipped as the arrangement shown in FIG. 1, the number of times of iteration on the receiving apparatus may be made different from one sub-channel to another.

A pilot signal for reception-level measurement is sent from DFT unit 206 to scheduling unit 220. Based on the measurement result on the reception level using this signal, scheduling unit 220 performs scheduling (determining allocation of users to sub-channels), taking into account the transmission condition of each user terminal. In this scheduling, each user is allocated to a sub-channels having better channel condition so as to obtain multi-user diversity gains, whereby it is possible to obtain better reception performance even when part of spectrums at the end is clipped. The mapping information determined by scheduling unit 220 is subjected to modulation and the like at transmitter 221, passed through D/A converter 222, radio unit 223 and the like, and then transmitted from antenna unit 224 to each user terminal. This mapping information is used for transmission of the next frame and afterward from each user. Further, the mapping information is used for a process of picking up sub-carriers for each sub-channel in sub-carrier demapping unit 207 when the associated frame is received.

With this base station configuration, in the FDMA system in which the signals that are output in parallel from the DFT unit of each terminal and partially clipped at the ends thereof are allocated to a sub-channel, it is possible to correctly demodulate the signal transmitted from each user by implementing non-linear iterative equalization by regarding the processing of clipping as distortion due to radio channel.

The Third Embodiment

Figure 6:
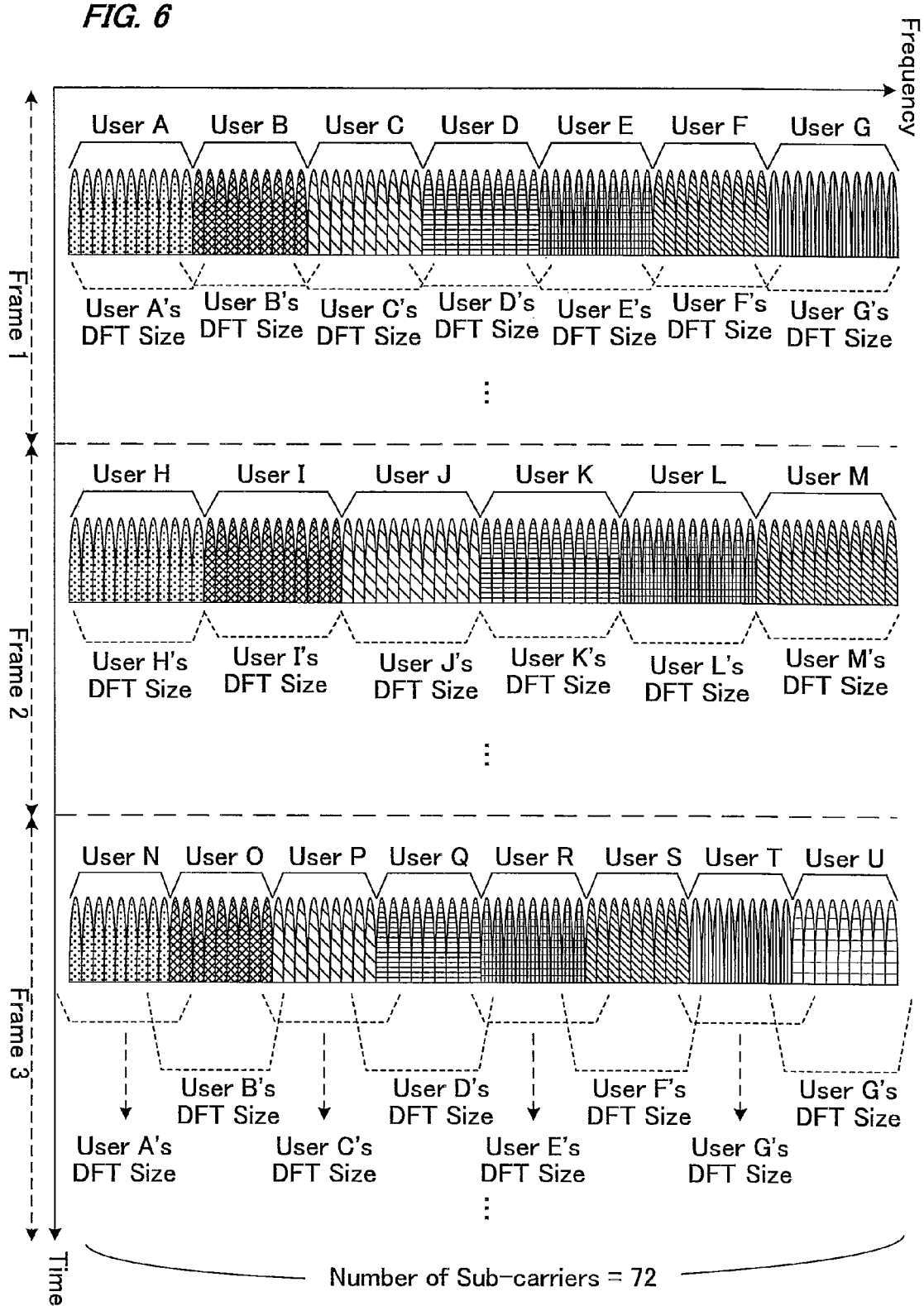
FIG. 6 is a diagram showing relationships between frames and sub-channels in the third embodiment of the radio communication system according to the present invention.

This embodiment shows an example where the number of frequency signals to be clipped varies every time-channel (frame). FIG. 6 shows a relationship between frames and sub-channels in the present embodiment. Here, though not illustrated in FIG. 6, each frame is formed of a plurality of symbols. As shown in FIG. 6, in the present embodiment, a different number of frequency signals are clipped for every frame so as to provide a different number of sub-channels (the maximum user capacity) in every frame. For example, the number of frequency signals to be clipped from each user allocated in frame 1 in FIG. 6 is two so that seven sub-channels can be provided. On the other hand, in frame 2, no clipping is performed for every user, the number of sub-channels is six. Further, the number of sub-channels in frame 3 is eight, and three frequency signals are clipped from each user allocated to this frame. In this way, the number of frequency signals to be clipped is set to be different every frame, so that it is possible to provide a different number of sub-channels for every frame, hence making it possible to create a system that can use limited resources in a flexible manner.

Usually, as the number of frequency signals to be clipped becomes greater, the reception performance degrade. However, it is possible to prevent degradation of reception performance by adaptively selecting the users to be allocated to each frame, in the system as in the present embodiment in which the number of frequency signals to be clipped varies every frame. This can be done by, for example, allocating, among the users to be allocated, the users whose channel conditions are good, to the frame having a greater number of clipping while allocating the users whose channel conditions are not so good to the frame having a lower number of clipping (or no clipping). In this case, a number of thresholds may be previously set in relation to reception SNR, and the thresholds may be further related with the numbers of clipping. Here, the higher the threshold, the greater the number of clipping should be set to be.

Further, the reception performance not only depend on the value of reception SNR, but greatly depend on variations of the channel on the frequency axis. That is, when the frequency response of the allocated channel is relatively flat, the reception performance is less affected by inter-symbol interference. On the other hand, when the frequency response greatly varies, the reception performance is greatly affected by inter-symbol interference. Accordingly, when not only the reception SNR but also the frequency response of the channel is taken into consideration, it is possible to further improve reception performance by allocating a channel having a relatively flat frequency response to be allocated, to the frame formed of sub-channels having a greater number of clipping, and allocating a channel having a less flat response frequency to be allocated, to the frame formed of sub-channels having a lower number of clipping.

Herein, as the indicator that shows the variation of the frequency response of a channel, for example the delay time, power and the like of delayed waves can be mentioned. The user who uses a channel that has delayed waves with high power and long delay time, is adapted to be allocated to a sub-channel in a frame formed of sub-channels having a lower number of clipping while the user who uses a channel that has not many delayed waves with high power is adapted to be allocated to a frame formed of sub-channels having a greater number of clipping. Further, it is possible to grasp the variation of a channel to some degree by such a simple control, that is, by determining the number of sub-carriers in the allocated sub-channel that are lower than the average power level of the sub-channel. In this case, when a greater number of sub-carriers fall below the average power level, the channel is regarded as being greatly varying in the sub-channel and the user is allocated to a frame that is formed of sub-channels having a lower number of clipping. When a lower number of sub-carriers fall below the average power level, the channel of the sub-channel is regarded as being relatively flat, and the user is allocated to a frame that is formed of sub-channels having a greater number of clipping.

With use of the allocation as above, the users who are allocated to the frame having a greater number of clipping as frame 3 of FIG. 6, because of having good channel conditions, can also reproduce transmitted data without seriously degrading performance. It is also possible to select frames to be allocated in accordance with the positions of the users in the cell. This method is effective in a system in which the target value in transmitting power control of users located close to the base station apparatus is higher than the target value of the users located distant from the base station apparatus. The users located to close to the base station apparatus are allocated to a frame having a greater number of clipping and the users located distant from the base station apparatus are allocated to a frame having a lower number of clipping.

The Fourth Embodiment

This embodiment shows an example in which the number of frequency signals to be clipped is designed based on the input/output relationship of mutual information of the equalizer and the input/output relationship of mutual information of the decoder. Further, an example of design for optimizing the coding rate used for transmission when the number of clipping is determined will be also shown.

Figure 7:
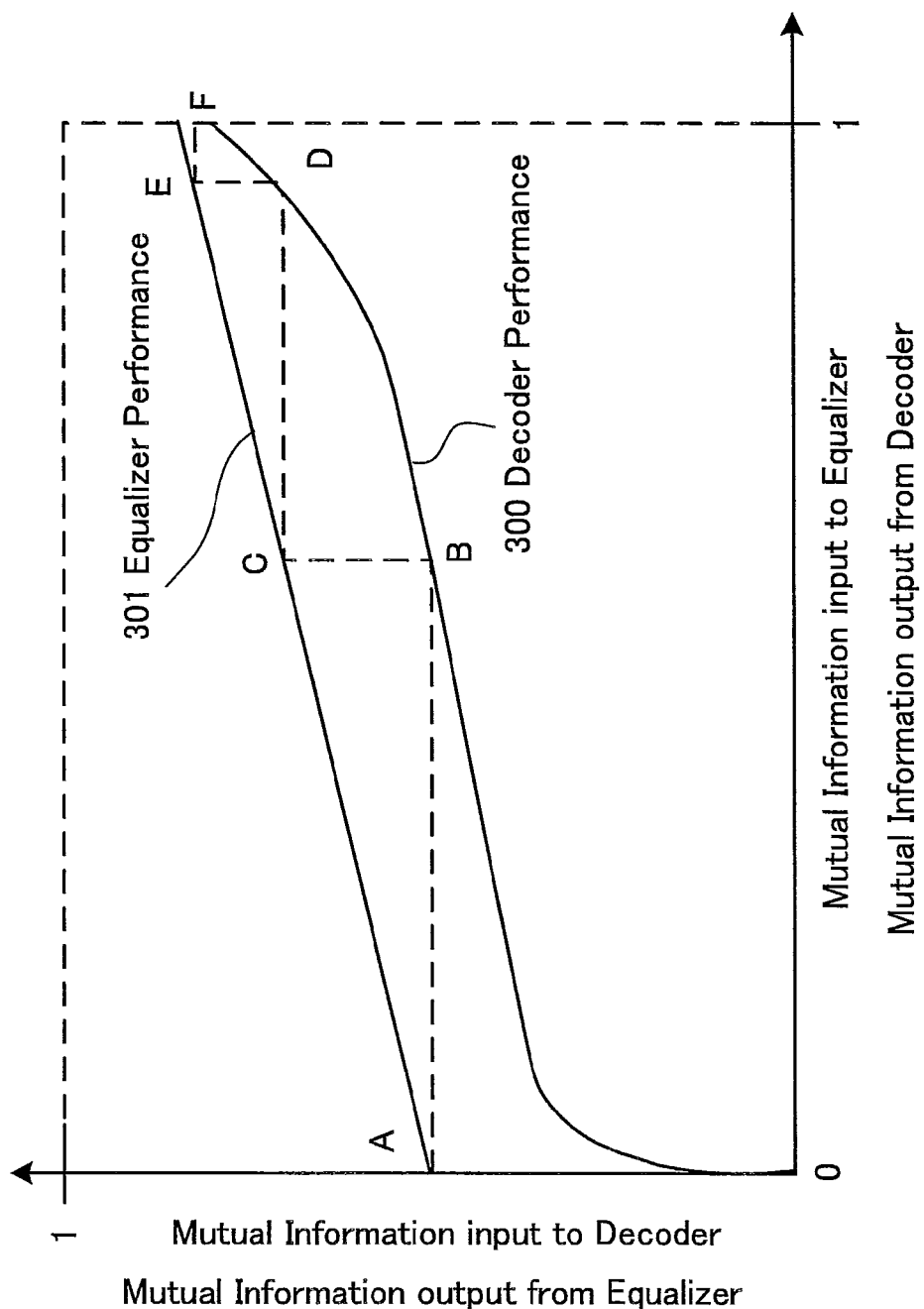
FIG. 7 is a diagram showing an example of an extrinsic information transfer chart for analyzing the inside of iteration such as the turbo principle in the fourth embodiment of the radio communication system according to the present invention.

First, a technique using an extrinsic information transfer chart (EXIT chart: EXtrinsic Information Transfer chart) for analyzing the inside of iteration such as the turbo principle will be described. FIG. 7 shows an example of an EXIT chart.

In FIG. 7, the horizontal axis represents the mutual information input to the equalizer and the vertical axis represents the mutual information output from the equalizer. In the iterative process, since the mutual information output from the equalizer is input to the decoder, the vertical axis coincides with the mutual information input to the decoder. Further, since the output from the decoder becomes the mutual information input to the equalizer, the horizontal axis coincides with the mutual information of the decoder. Here, mutual information is the information on X that can be acquired from Y when a certain signal X is sent and a received signal Y is obtained. In an EXIT analysis, when mutual information is defined as the information on X that can be acquired from Y when received signal Y is obtained, the maximum value is limited to 1.

In FIG. 7, a line 300 denotes the input/output relationship of the mutual information at the decoder when the input is on the vertical axis and the output is on the horizontal axis. Since a greater amount of power is needed for decoding as the coding rate becomes higher, the line translates upwards in the chart. On the other hand, a line 301 denotes the input/output relationship of the mutual information at the equalizer when the input is on the horizontal axis and the output is on the vertical axis. The decoder performance is determined uniquely, whereas the equalizer performance moves up and down depending on the channel variation, so that usually a statistical representation such as 1%-value is used. However, since the values at the start point and the end point are determined only on the channel and the reception quality, it is possible to approximately depict the characteristic as the snapshot of the channel variation at a moment.

Here, since line 300 representing the input/output performance of the decoder is determined uniquely to the structure of the error correction codes being used, it is possible to know the performance before an iterative process. On the other hand, since line 301 representing the input/output performance of the equalizer is determined based on the channel and SNR, it is impossible to depict it in detail before hand. Nevertheless, the value when the input extrinsic mutual information of the equalizer is zero (indicating the point A in FIG. 7 and this position is called the start point) and the value when the input extrinsic mutual information is one (indicating the point F in FIG. 7 and this position is called the end point) alone can be easily calculated in advance since the former represents the situation in which no information on the soft replica has been obtained and the latter represents the situation in which the soft replica perfectly coincides with the transmitted signal without error. Accordingly, approximated equalizer performance 301 can be calculated by linearly approximating the start point and the end point.

Next, how to read FIG. 7 will be described. First, at the first step, since the input mutual information is zero, the mutual information at point A is obtained as the output of the equalizer. Next, since the mutual information of this equalizer output becomes the mutual information input to the decoder, the point moves as indicated by the dotted line and the mutual information of the output of the decoder falls at point B. The similar processes are iterated, so that the mutual information is known to successively move to point C, point D, point E and point F. Thus, it is possible to illustrate the behavior of the inside of iteration. The end point of the equalizer performance means that interference components are completely removed, and the performance is determined on the reception power of the desired signal and the power of noise only. That is, this means the state in which inter-symbol interference enhanced by clipping becomes completely removable. The dashed line denoting the above movement is called an EXIT locus, use of which makes it possible to design whether transmitted data can be detected by the iterative process. Here, it brings about a preferable design when the line of the decoder is located below the line of the equalizer without creating any intersection between the two lines of the decoder and the equalizer.

Figure 8:
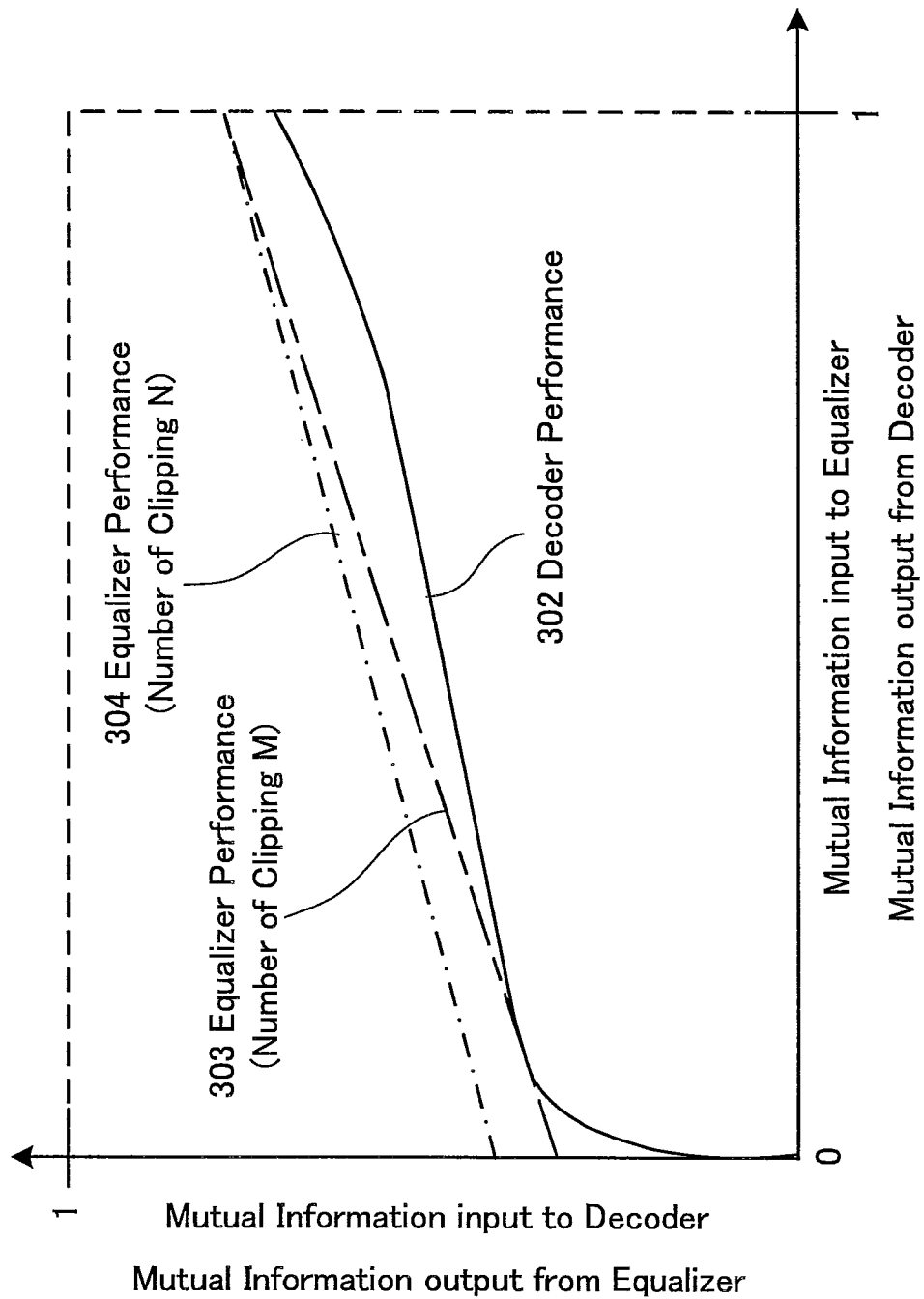
FIG. 8 is a diagram showing a statistical EXIT locus when the number of frequency signals to be clipped is varied.
Figure 9:
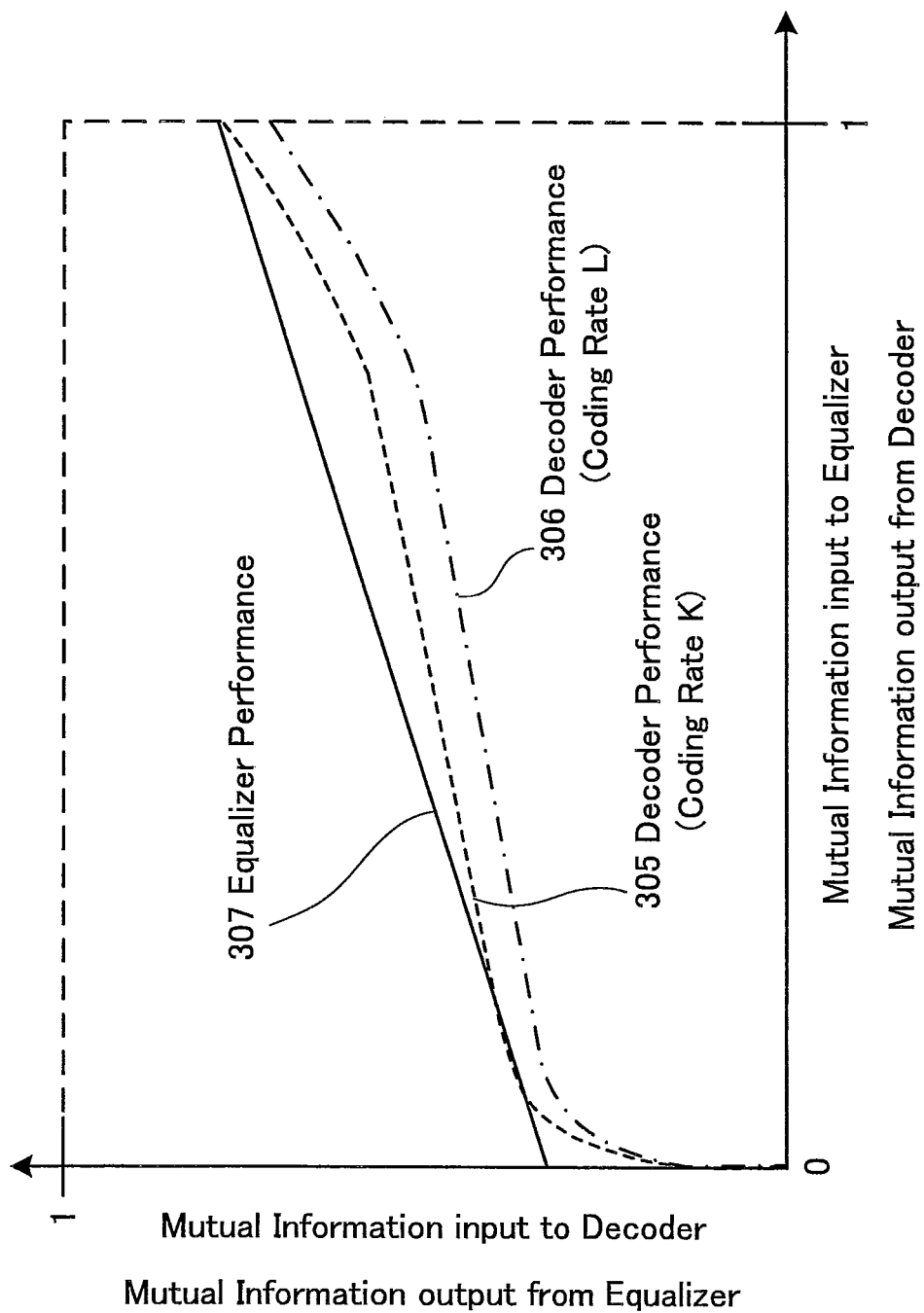
FIG. 9 is a diagram showing a statistical EXIT locus when the coding rate is set so as not to produce a crossing with the line of the equalizer in the condition that the number of clipping per sub-carrier is previously determined.
Figure 10:
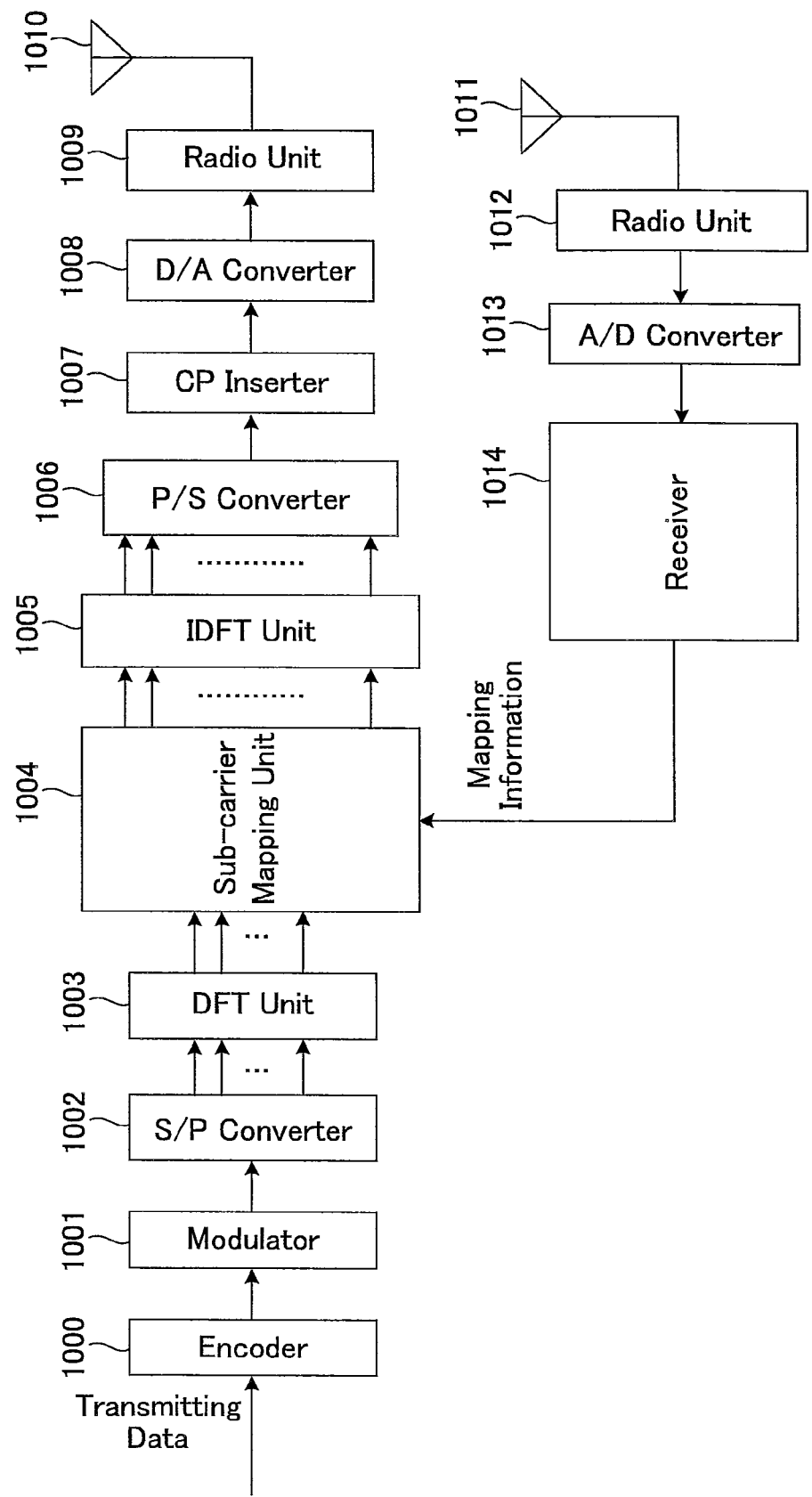
FIG. 10 is a diagram showing a terminal apparatus configuration when a conventional SC-FDMA scheme is used for uplink transmission.

FIG. 8 shows a statistical EXIT locus when the number of frequency signals to be clipped is varied. Lines 303 and 304 in FIG. 8 show the equalizer performance when the number of clipping is M and N (M>N), respectively. As shown in FIG. 8, when a greater number of the frequency signals are clipped, the start point of the equalizer performance is down. This represents that a stronger influence of inter-symbol interference appears as a result of the greater number of clipping and indicates that the interference cannot be removed at the initial stage of the iterative process. The end points (of lines 304 and 302) coincide with each other on the average, without depending on the number of clipping because the end point shows the performance when influence of inter-symbol interference due to clipping has been removed by the iterative process.

In this FIG. 8, when the number of clipping is N, line 304 of the equalizer is located above line 302 of the decoder, so that it is possible to separate by iteration. On the other hand, when the number of clipping is set at M, line 303 of the equalizer crosses line 302 of the decoder, so that the mutual information on or above the crossing point cannot be obtained. In other words, inter-symbol interfere is so strong that the influence cannot be removed by the iterative process. After all, this case is enabled by such a design that the number of frequency signals each user clips is set at N, and the number of sub-channels can also be adjusted in accordance with the design.

Instead of handling the EXIT locus based on a statistical representation such as 1%-value, the locus for channel variation at a moment, e.g., every frame unit, may be drawn so as to adaptively set up the number of frequency signals to be clipped. In this case, by drawing the EXIT loci of the equalizer in the approximating method described above as the number of clipping is varied in the channel variation of the sub-channel allocated to each user every frame, the number of clipping is selected so that the EXIT locus will not cross the line of the decoder. For example, this control is performed such that the user who is allocated to a sub-channel having good channel conditions is set up with a greater number of clipping, whereas the user who is allocated to a sub-channel having not so good channel conditions is set up with a lower number of clipping. In this case, the terminal should have a configuration that can change the DFT size of each user in accordance with the number of clipping (enlarge the DFT size when the number of clipping is large and reduce the DFT size when the number of clipping is small). In this way, it is possible to construct a system that can realize different transmission rates for individual sub-channels (individual users) by adaptively control the number of clipping even when all the numbers of sub-carriers for every sub-channel are the same.

In contrast, when the number of clipping per sub-channel is previously determined, it is also possible to prevent degradation of reception performance by adjusting the coding rates by taking the EXIT locus into consideration. This can be realized by setting a coding rate that will not occur a crossing with line 307 of the equalizer (in this case, a line 306 with a coding rate of L will not cross, whereas a line 305 with a coding rate of K will cross, where K>L) so as to enhance robustness to the interference that cannot be removed at the initial stage of iteration. Though this is shown in relation with the coding rate, it is possible to make a plan by changing the method of encoding (turbo coding, concatenated coding, low density parity check (LDPC: Low Density Parity Check) coding, etc.). Thus, it is possible to enhance the flexibility when the system is planned. Selection of the coding rate and the encoding method as above can be adaptively performed by drawing an EXIT locus every frame as a unit on the base station side.

Though the embodiments described heretofore were discussed on the SC-FDMA scheme that generate frequency-spread signals using DFT, instead of this the present invention can be applied to a scheme that generates frequency-spread signals by multiplying spread codes (e.g., MC-CDMA)

scheme when the signal after frequency spreading is partly deleted at its ends on the transmitter side while an iterative equalization process is performed on the receiver side by inserting zeros into the positions that were deleted on the transmitter side.

The present invention should not be limited to the above embodiments, and various changes can be made therein without departing from the scope of the gist of the present invention.

DESCRIPTION OF REFERENCE NUMERALS 100 encoder
101 modulator
102 S/P converter
103 DFT unit
104 spectrum clipping unit
105 sub-carrier mapping unit
106 IDFT unit
107 P/S converter
108 CP insert unit
109 D/A converter
110 radio unit
111 transmitting antenna unit
112 receiving antenna unit
113 radio unit
114 A/D converter
115 receiver
200 receiving antenna unit
201 radio unit
202 A/D converter
203 Synchronizer
204 CP remover
205 S/P converter
206 DFT unit
207 sub-carrier demapping unit
208 zero insert unit
209 canceller
210 equalizer
211 IDFT unit
212 demodulation and error correction decoder
213 iteration controller
214 decision unit
215 channel estimator
216 zero insert unit
217 channel multiplier
218 DFT unit
219 replica generator
220 scheduling unit
221 transmitter
222 D/A converter
223 radio unit
224 transmitting antenna unit

The invention claimed is:

1. A radio communication system comprising:
a transmitting apparatus that generates a first spread spectrum signal by performing a spread spectrum of a time-domain information signal and transmits the spread spectrum transmitting signal with allocating the spread spectrum transmitting signal to any one of a plurality of contiguous frequency channels defined in a constant frequency band formed of a plurality of sub-carriers and to any one of a plurality of time channels defined as having a constant time length; and
a receiving apparatus for receiving the transmitting signal, wherein the number of sub-carriers N that constitute one of the frequency channels is previously set so as to be lower than the number of sub-carriers M that constitute the first spread spectrum signal,
the transmitting apparatus generates a second spread spectrum signal, which is constituted by the N sub-carriers, by deleting the (M−N)/2 sub-carriers at both ends of the first spread spectrum signal in order to allocate the transmitting signal to a frequency channel and transmits the second spread spectrum signal, and,
the receiving apparatus receives the transmitted signal from the transmitting apparatus and performs a reproducing process of the time domain information signal to be noticed by the first spread spectrum signal, based on the received signal,
wherein the time domain information signal is sent by the M sub-carriers is noticed using the frequency channel formed of the N sub-carriers.

2. The radio communication system according to claim 1, wherein the receiving apparatus reproduces the time domain information signal by performing non-liner iteration equalization on the received signal.

3. The radio communication system according to claim 1, wherein one or more frequency channels whose number of sub-carriers that constitute the frequency channel is different from that of other frequency channels is included in the constant frequency band.

4. The radio communication system according to claim 1, wherein one or more time channels whose number of the frequency channels that constitute the time channel is different from that of other time channels.

5. A transmitting apparatus that generates a first spread spectrum signal formed of M sub-carriers by performing a spread spectrum of a time-domain information signal and transmits the spread spectrum transmitting signal with allocating the spread spectrum transmitting signal to any one of a plurality of contiguous frequency channels defined in a constant frequency band formed of a plurality of sub-carriers and to any one of a plurality of time channels defined as having a constant time length,
wherein when the number of sub-carriers constituting one of the frequency channels is N which is smaller than M, in order to allocate the transmitting signal to a frequency channel, the transmitting apparatus deletes the (M−N)/2 sub-carriers at both ends of the first spread spectrum signal to generate a second spread spectrum signal and transmits the second spread spectrum signal.

* * * * *